United States Patent
Liu

(10) Patent No.: US 9,569,105 B2
(45) Date of Patent: Feb. 14, 2017

(54) METHOD FOR MANAGING VIRTUAL CONTROL INTERFACE OF AN ELECTRONIC DEVICE, AND ASSOCIATED APPARATUS AND ASSOCIATED COMPUTER PROGRAM PRODUCT

(71) Applicant: MEDIATEK INC., Hsin-Chu (TW)

(72) Inventor: Kai-Wen Liu, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 416 days.

(21) Appl. No.: 14/307,499

(22) Filed: Jun. 18, 2014

(65) Prior Publication Data

US 2015/0370476 A1 Dec. 24, 2015

(51) Int. Cl.
```
G06F 3/048      (2013.01)
G06F 3/0488     (2013.01)
G06F 3/0481     (2013.01)
G06F 9/54       (2006.01)
G06F 3/0482     (2013.01)
G06F 9/44       (2006.01)
G06F 9/455      (2006.01)
```

(52) U.S. Cl.
CPC ......... G06F 3/04886 (2013.01); G06F 3/048 (2013.01); G06F 3/0481 (2013.01); G06F 3/0482 (2013.01); G06F 9/54 (2013.01); *G06F 8/34* (2013.01); *G06F 9/4443* (2013.01); *G06F 9/45512* (2013.01); *G06F 2203/0383* (2013.01)

(58) Field of Classification Search
CPC .. G06F 3/04886; G06F 3/0481; G06F 3/0482; G06F 2203/0383; G06F 9/54; G06F 8/34; G06F 3/048; G06F 9/4443; G06F 17/3089; G06F 17/30899; G06F 9/45512; G06F 1/1613

See application file for complete search history.

(56) References Cited

U.S. PATENT DOCUMENTS

| | | | | |
|---|---|---|---|---|
| 9,324,234 B2* | 4/2016 | Ricci | ......................... | G06F 9/54 |
| 2003/0158753 A1* | 8/2003 | Bernston | ........... | G06F 17/30917 705/2 |
| 2004/0061714 A1* | 4/2004 | Sinclair | ................. | G06F 9/4443 715/705 |
| 2005/0091670 A1* | 4/2005 | Karatal | ..................... | G06F 8/10 719/328 |
| 2005/0097574 A1* | 5/2005 | Morrison | .................. | G06F 8/38 719/328 |

(Continued)

*Primary Examiner* — Shen Shiau

(74) *Attorney, Agent, or Firm* — Han IP Corporation; Andy M. Han

(57) ABSTRACT

A method for managing virtual control interface of an electronic device, and an associated apparatus and an associated computer program product are provided, where the method includes: utilizing a specific set of common user interfaces (UIs) as a common service for a plurality of applications, wherein the specific set of common UIs is a set of virtual control interfaces to be displayed on a screen, and the specific set of common UIs is provided by a system framework running on the electronic device, rather than being provided by any of the plurality of applications; and displaying the specific set of common UIs to allow a user to control the electronic device through the specific set of common UIs. The method may further include: selecting the specific set of common UIs from a plurality of sets of common UIs.

20 Claims, 11 Drawing Sheets

(56) References Cited

U.S. PATENT DOCUMENTS

| | | | |
|---|---|---|---|
| 2005/0193370 A1* | 9/2005 | Goring | G06F 9/4443 |
| | | | 717/115 |
| 2006/0041445 A1* | 2/2006 | Aaron | G09B 7/00 |
| | | | 706/47 |
| 2010/0205301 A1* | 8/2010 | Ansari | G06Q 30/04 |
| | | | 709/225 |
| 2013/0219303 A1* | 8/2013 | Eriksson | G06F 3/1454 |
| | | | 715/759 |
| 2014/0149998 A1* | 5/2014 | Kumar | G06F 21/31 |
| | | | 719/318 |
| 2014/0280767 A1* | 9/2014 | Bridges | H04L 67/34 |
| | | | 709/219 |
| 2014/0351832 A1* | 11/2014 | Cho | H04L 67/141 |
| | | | 719/328 |
| 2015/0120817 A1* | 4/2015 | Jeong | G06F 3/1454 |
| | | | 709/203 |

\* cited by examiner

METHOD FOR MANAGING VIRTUAL CONTROL INTERFACE OF AN ELECTRONIC DEVICE, AND ASSOCIATED APPARATUS AND ASSOCIATED COMPUTER PROGRAM PRODUCT

BACKGROUND

The present invention relates to user interface of an electronic device, and more particularly, to a method for managing virtual control interface of an electronic device, and an associated apparatus and an associated computer program product.

A conventional portable electronic device such as a conventional multifunctional mobile phone can be designed to run various types of conventional applications. For example, some of the conventional applications can be games. When a user plays one of the games through the conventional multifunctional mobile phone, he/she typically needs a user interface (UI) to control the game. According to the related art, the developers of the games have to design their own UIs, respectively, and typically have to provide the resources needed by fancy display of the games, respectively. However, some problems may occur. For example, various input UIs correspond to various input experiences, respectively, and the user may need to spend his/her time on learning again and again. In another example, for the various input UIs, the developers may be forced to redesign, and therefore, the various input UIs really waste their time. In another example, when the input UIs are fancy, more resources are needed. As a result, the games may waste the storage capacity of the conventional multifunctional mobile phone, and may waste the time of the user during the download operations of these games. Thus, a novel method is required for improving the basic design architecture and enhancing the user experience.

SUMMARY

It is an objective of the claimed invention to provide a method for managing virtual control interface of an electronic device, and an associated apparatus and an associated computer program product, in order to solve the above-mentioned problems.

It is another objective of the claimed invention to provide a method for managing virtual control interface of an electronic device, and an associated apparatus and an associated computer program product, in order to provide consistent user experience for end-users.

It is another objective of the claimed invention to provide a method for managing virtual control interface of an electronic device, and an associated apparatus and an associated computer program product, in order to facilitate the development of applications to be run on the electronic device and to save the storage capacity of the electronic device and reduce the download time of the applications.

According to at least one preferred embodiment, a method for managing virtual control interface of an electronic device is provided, where the method comprises the steps of: utilizing a specific set of common user interfaces (UIs) as a common service for a plurality of applications, wherein the specific set of common UIs is a set of virtual control interfaces to be displayed on a screen, and the specific set of common UIs is provided by a system framework running on the electronic device, rather than being provided by any of the plurality of applications; and displaying the specific set of common UIs to allow a user to control the electronic device through the specific set of common UIs. More particularly, the method may further comprise: selecting the specific set of common UIs from a plurality of sets of common UIs, wherein each set of common UIs within the plurality of sets of common UIs is a set of virtual control interfaces to be displayed on the screen, and the plurality of sets of common UIs is provided by the system framework running on the electronic device, rather than being provided by any of the plurality of applications.

According to at least one preferred embodiment, an apparatus for managing virtual control interface of an electronic device is provided, where the apparatus comprises at least one portion of the electronic device. The apparatus comprises a processing circuit arranged to control operations of the electronic device according to program instructions. In addition, the processing circuit utilizes a specific set of common user interfaces (UIs) as a common service for a plurality of applications, wherein the specific set of common UIs is a set of virtual control interfaces to be displayed on a screen, and the specific set of common UIs is provided by a system framework running on the electronic device, rather than being provided by any of the plurality of applications. Additionally, the processing circuit controls a display module of the electronic device to display the specific set of common UIs to allow a user to control the electronic device through the specific set of common UIs. More particularly, the processing circuit may select the specific set of common UIs from a plurality of sets of common UIs, wherein each set of common UIs within the plurality of sets of common UIs is a set of virtual control interfaces to be displayed on the screen, and the plurality of sets of common UIs is provided by the system framework running on the electronic device, rather than being provided by any of the plurality of applications.

According to at least one preferred embodiment, a computer program product is provided, where the computer program product has program instructions for instructing a processor of an electronic device to perform a method comprising the steps of : utilizing a specific set of common user interfaces (UIs) as a common service for a plurality of applications, wherein the specific set of common UIs is a set of virtual control interfaces to be displayed on a screen, and the specific set of common UIs is provided by a system framework running on the electronic device, rather than being provided by any of the plurality of applications; and displaying the specific set of common UIs to allow a user to control the electronic device through the specific set of common UIs. More particularly, the method may further comprise: selecting the specific set of common UIs from a plurality of sets of common UIs, wherein each set of common UIs within the plurality of sets of common UIs is a set of virtual control interfaces to be displayed on the screen, and the plurality of sets of common UIs is provided by the system framework running on the electronic device, rather than being provided by any of the plurality of applications.

It is an advantage of the present invention that the present invention method, the associated apparatus, and the associated computer program product can provide consistent user experience for end-users. In addition, the present invention method, the associated apparatus, and the associated computer program product can facilitate the development of applications to be run on the electronic device. For example, the plurality of sets of common UIs is reusable for application developers, where the application developers (more particularly, game developers) do not need to re-design the input interface for every application (more particularly, for every game). As a result, the size of each application (more particularly, each game) can be reduced. Additionally, the present invention method, the associated apparatus, and the associated computer program product can save the storage capacity of the electronic device and reduce the download time of the applications.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
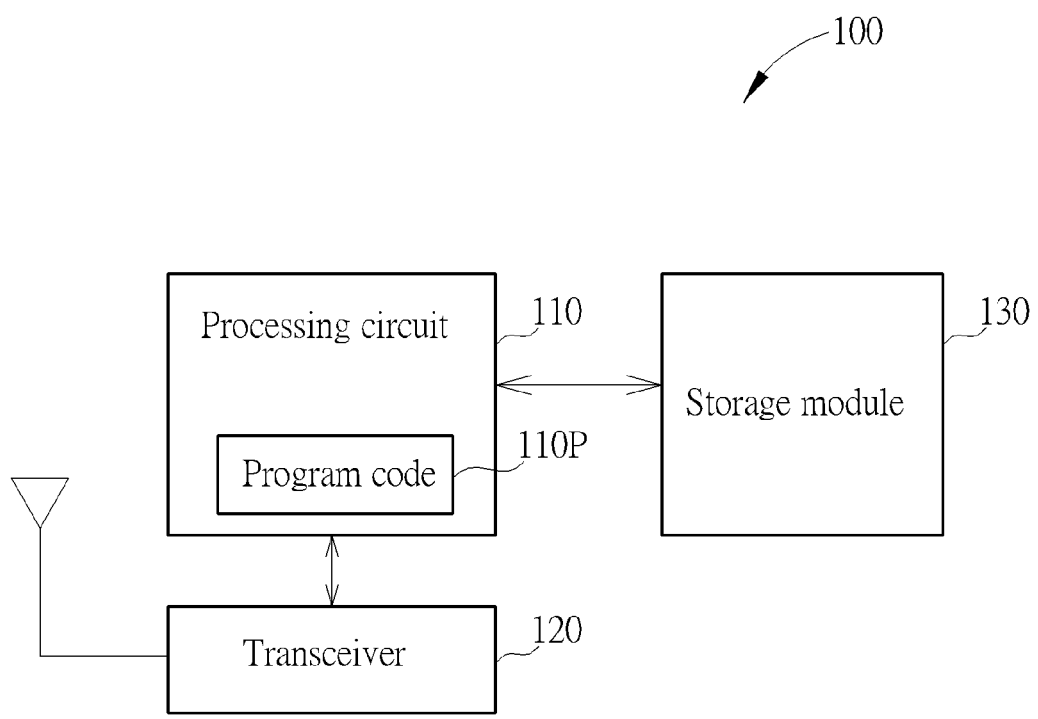
FIG. 1 is a diagram of an apparatus for managing virtual control interface of an electronic device according to a first embodiment of the present invention.

Please refer to FIG. 1, which illustrates a diagram of an apparatus 100 for managing virtual control interface of an electronic device according to a first embodiment of the present invention, where the apparatus 100 may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device. In another example, the apparatus 100 can be the whole of the electronic device mentioned above. In another example, the apparatus 100 may comprise a system comprising the electronic device mentioned above (e.g. an audio/video system comprising the electronic device). Examples of the electronic device may include, but not limited to, a mobile phone (e.g. a multifunctional mobile phone), a personal digital assistant (PDA), a tablet and a personal computer such as a laptop computer.

As shown in FIG. 1, the apparatus 100 may comprise a processing circuit 110 arranged to control operations of the electronic device, and may further comprise a transceiver 120 arranged to transmit and/or receive information for the electronic device, where the transceiver 120 may be coupled to the processing circuit 110, and one or more antennas of the electronic device may be coupled to the transceiver 120. For example, the processing circuit 110 may comprise at least one processor and associated hardware resources, and the transceiver 120 may comprise a transmitter and a receiver such as those for wireless network communications, where the processor may execute some program codes 110P (e.g. program instructions). More particularly, the apparatus 100 may further comprise a storage module 130 (e.g. a hard disk drive (HDD), a non-volatile memory such as a Flash memory, or a dynamic random access memory (DRAM)) arranged to store information, data and/or program codes for the electronic device, and the processing circuit 110 may be arranged to control the aforementioned operations of the electronic device according to the program codes 110P (e.g. program instructions) loaded (or retrieved) from its internal storage or the storage module 130.

According to this embodiment, the processing circuit 110 may allow multiple applications to use the same virtual control interface set, where this virtual control interface set may be provided by a system framework running on the electronic device (e.g. the system framework of an operating system (OS) of the electronic device). For example, these applications can be game applications (which can be referred to as games in this example, for brevity), and these games may share and use this virtual control interface set. In addition, the processing circuit 110 may select one of multiple virtual control interface sets that are originally provided by the system framework, and utilize the selected virtual control interface set as the control interface between the electronic device and the user of the electronic device when an application such as a game is running on the electronic device. As the application developers (for example, the game developers) of many applications may arrange these applications to call any of the multiple virtual control interface sets originally provided by the system framework, they do not need to design (or re-design) the input interfaces of the applications, and therefore, the development loading of the applications can be greatly reduced, and the size of each of the applications can be greatly reduced since these applications may share and use one or more of the multiple virtual control interface sets mentioned above. In addition, for the user of the electronic device, the download time of each of the applications can be greatly reduced, and each of the applications will not occupy too much storage capacity of the electronic device.

Figure 2:
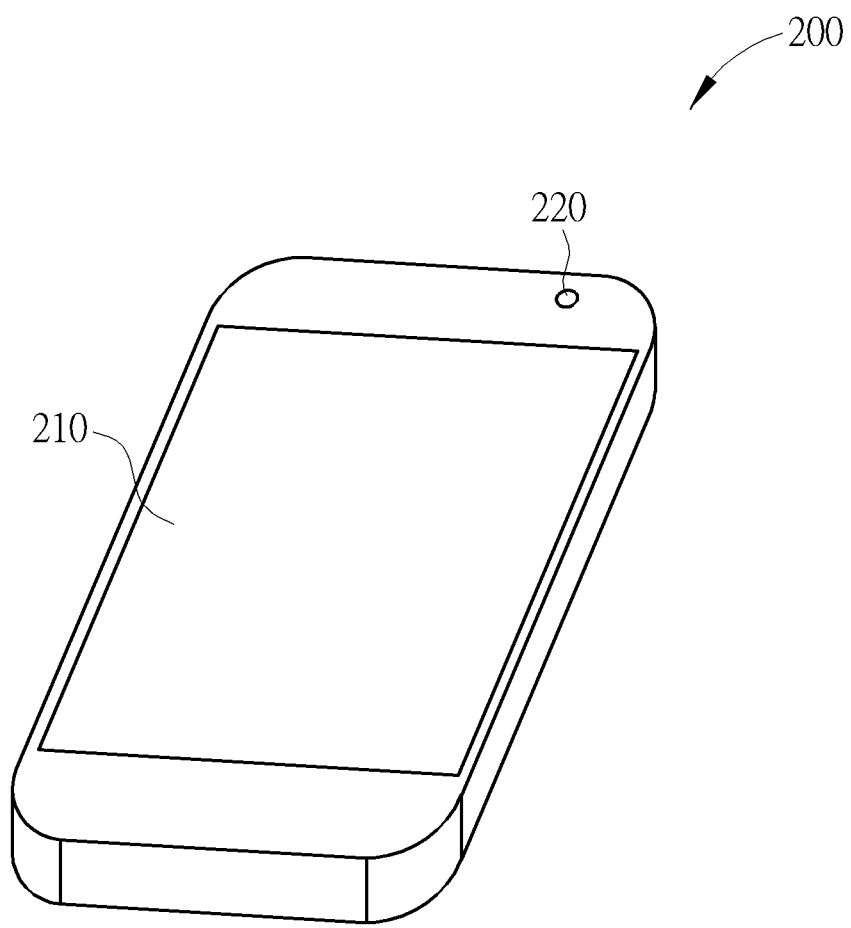
FIG. 2 illustrates a multifunctional mobile phone involved with the apparatus shown in FIG. 1 according to an embodiment of the present invention.

FIG. 2 illustrates a multifunctional mobile phone 200 involved with the apparatus 100 shown in FIG. 1 according to an embodiment of the present invention, where the multifunctional mobile phone 200 can be taken as an example of the electronic device mentioned above. As shown in FIG. 2, the multifunctional mobile phone 200 may comprise a display module 210 and a camera 220. The display module 210 may be a touch sensitive display module. In some embodiments, the display module 210 may comprise a liquid crystal display (LCD) module (which can be referred to as LCM, for brevity) and a touch panel, where the LCD module may be arranged to display information for the multifunctional mobile phone 200, and the touch panel may be arranged to detect user inputs (e.g. user gesture inputs). This is for illustrative purposes only, and is not meant to be a limitation of the present invention.

Figure 3:
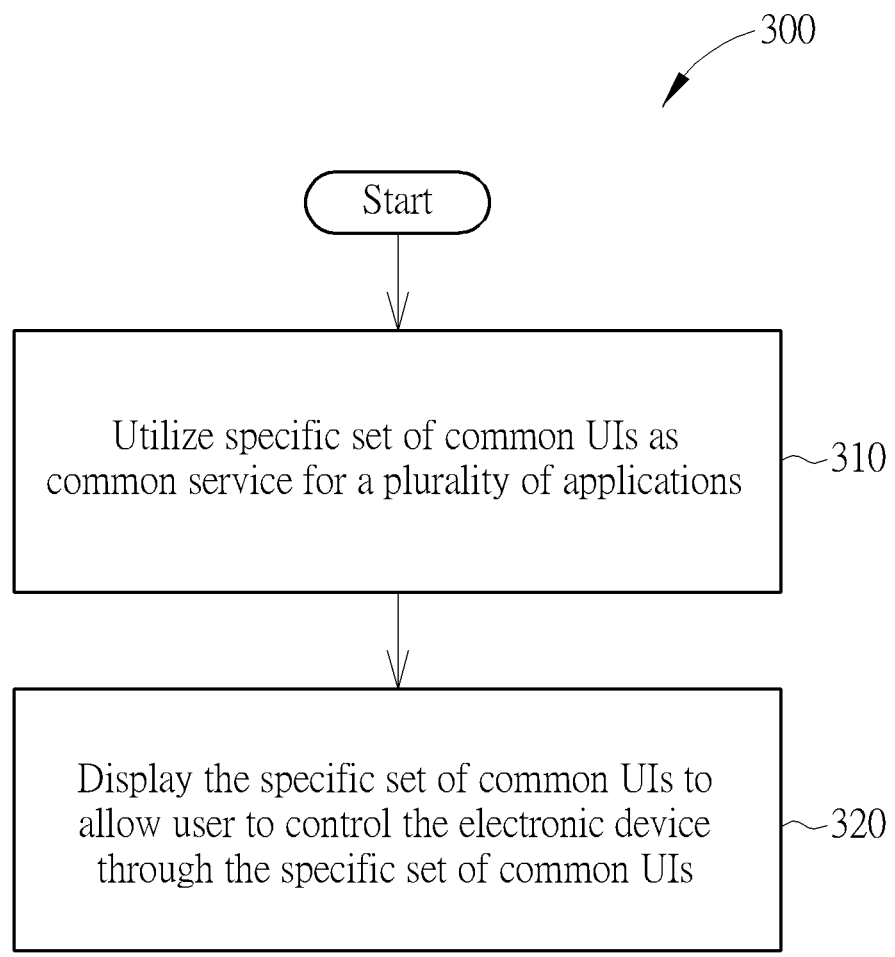
FIG. 3 illustrates a flowchart of a method for managing virtual control interface of an electronic device according to an embodiment of the present invention.

FIG. 3 illustrates a flowchart of a method 300 for managing virtual control interface of an electronic device according to an embodiment of the present invention. The method 300 shown in FIG. 3 can be applied to the apparatus 100 shown in FIG. 1 (more particularly, the multifunctional mobile phone 200 of the embodiment shown in FIG. 2), and can be applied to the processing circuit 110 thereof (more particularly, the processing circuit 110 executing the program codes 110P of the embodiment shown in FIG. 1). For example, the program code 110P may be provided through a computer program product having program instructions (such as those mentioned above) for instructing a processor such as that mentioned above to perform the method 300 shown in FIG. 3, where the computer program product may be implemented as a non-transitory computer-readable medium (e.g. a floppy disk or a compact disc-read only memory (CD-ROM)) storing the program instructions or an equivalent version thereof, such as a software package for being installed. This is for illustrative purposes only, and is not meant to be a limitation of the present invention. The method can be described as follows.

In Step 310, the processing circuit 110 may utilize a specific set of common user interfaces (UIs) as a common service for a plurality of applications, where the specific set of common UIs can be a set of virtual control interfaces to be displayed on a screen such as the display module 210, and the specific set of common UIs may be provided by a system framework such as that mentioned above (e.g. the aforementioned system framework running on the electronic device), rather than being provided by any of the plurality of applications. For example, the plurality of applications can be game applications (which can be referred to as games in this example, for brevity), and these games may share and use this specific set of common UIs. In one embodiment, there may be a plurality of sets of common UIs for different types of applications. For example, there can be a first set of common UI for a first type of game application, a second set of common UI for a second type of game application, a third set of common UI for a TV watching application and a fourth set of common UI for a music playback application. Therefore, in one embodiment, the processing circuit 110 may select the specific set of common UIs from a plurality of sets of common UIs, for being utilized by a specific application of the plurality of applications, where each set of common UIs within the plurality of sets of common UIs can be a set of virtual control interfaces to be displayed on a screen such as the LCD module (or LCM) within the display module 210, and the plurality of sets of common UIs may be provided by the aforementioned system framework running on the electronic device (e.g. the system framework of the OS mentioned above), rather than being provided by any of the plurality of applications. More particularly, each set of common UIs within the plurality of sets of common UIs may be provided by the system framework running on the electronic device, rather than being provided by any application installed in the electronic device. This is for illustrative purposes only, and is not meant to be a limitation of the present invention. No matter whether the operation of selecting the specific set of common UIs from the plurality of sets of common UIs mentioned above is performed (e.g. by the processing circuit 110) or not, implementation of the operation of Step 310 will not be hindered. In addition, no matter whether the plurality of sets of common UIs mentioned above is provided (e.g. for being selected by the processing circuit 110) or not, implementation of the operation of Step 310 will not be hindered. Please note that the operation of Step 310 can be performed before, when or after the specific application starts running on the electronic device. For better comprehension, the plurality of sets of common UIs can be taken as an example of the aforementioned multiple virtual control interface sets. In practice, each set of common UIs within the plurality of sets may comprise at least one common UI, such as one or more common UIs. This is for illustrative purposes only, and is not meant to be a limitation of the present invention.

In Step 320, the processing circuit 110 may control the display module 210 of the electronic device to display the specific set of common UIs to allow the user to control the electronic device through the specific set of common UIs. More particularly, when (or after) the electronic device is switched to an extension mode (for example, it may be detected that the user switches the electronic device to the extension mode, and this detection maybe performed based on the user instruction indicated by a certain user action applied to the multifunctional mobile phone 200), the processing circuit 110 may control the display module 210 to display the specific set of common UIs to allow the user to control the electronic device through the specific set of common UIs, where in the extension mode, the electronic device is arranged to output display data to be displayed by another electronic device such as an external display device 10 (which is not shown in FIG. 3, and will be described in some of the following embodiments). For example, the other electronic device such as the external display device 10 can be a digital television (TV). In another example, the other electronic device such as the external display device 10 can be a monitor. This is for illustrative purposes only, and is not meant to be a limitation of the present invention. According to some variations of this embodiment, in a situation where the electronic device is not switched to the extension mode mentioned above, the method 300 shown in FIG. 3 can still be applied to the apparatus 100 shown in FIG. 1 (more particularly, the multifunctional mobile phone 200 of the embodiment shown in FIG. 2), and can still be applied to the processing circuit 110 thereof (more particularly, the processing circuit 110 executing the program codes 110P of the embodiment shown in FIG. 1). According to some variations of this embodiment, in a situation where the extension mode does not exist, the method 300 shown in FIG. 3 can still be applied to the apparatus 100 shown in FIG. 1 (more particularly, the multifunctional mobile phone 200 of the embodiment shown in FIG. 2), and can still be applied to the processing circuit 110 thereof (more particularly, the processing circuit 110 executing the program codes 110P of the embodiment shown in FIG. 1).

According to this embodiment, the processing circuit 110 may obtain a common UI selection parameter from the specific application, where the common UI selection parameter is utilized for indicating one set of common UIs within the plurality of sets of common UIs. In some embodiments, the processing circuit 110 may obtain the common UI selection parameter before, when or after the specific application starts running on the electronic device. In addition, the processing circuit 110 may select the specific set of common UIs from the plurality of sets of common UIs according to the common UI selection parameter, for being utilized by the specific application. This is for illustrative purposes only, and is not meant to be a limitation of the present invention. According to a variation of this embodiment, based on user setting(s) or default setting(s), the processing circuit 110 may determine the common UI selection parameter for the specific application, and the processing circuit 110 may select the specific set of common UIs from the plurality of sets of common UIs according to the common UI selection parameter determined by the processing circuit 110, for being utilized by the specific application. According to another variation of this embodiment, based on user setting(s) or default setting(s), the processing circuit 110 may select the specific set of common UIs from the plurality of sets of common UIs, for being utilized by the specific application.

According to some variations of this embodiment, the plurality of sets of common UIs may comprise a game control interface, a TV control interface, a music control interface or a combination thereof, where the game control interface may be used for game control and may comprise a virtual direction pad and one or more virtual buttons, the TV control interface maybe used for TV control and may comprise a virtual number pad, and the music control interface may be used for music control and may comprise a virtual circle bar. For example, the plurality of sets of common UIs may comprise the game control interface, the TV control interface, and the music control interface. In some other examples, the plurality of sets of common UIs may comprise one or more of the game control interface, the TV control interface, and the music control interface.

Figure 4:
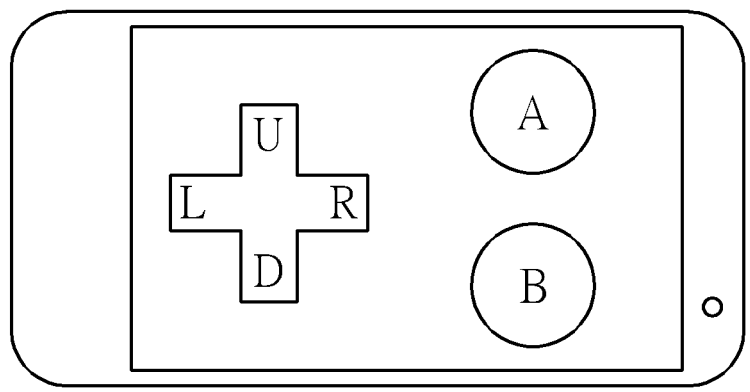
FIG. 4 illustrates a game control interface involved with the method shown in FIG. 3 according to an embodiment of the present invention.

FIG. 4 illustrates a game control interface involved with the method 300 shown in FIG. 3 according to an embodiment of the present invention, where the game control interface shown in FIG. 4 can be taken as an example of the game control interface mentioned above. For example, the aforementioned virtual direction pad may comprise four virtual partial-buttons (labeled "L", "R", "U", and "D" in FIG. 4, respectively) for direction control of the left direction, the right direction, the up direction, and the down direction, respectively, and the aforementioned one or more virtual buttons may comprise two virtual buttons (labeled "A" and "B" in FIG. 4, respectively). This is for illustrative purposes only, and is not meant to be a limitation of the present invention. For example, in addition to the aforementioned virtual direction pad shown in FIG. 4, the game control interface mentioned above may further comprise one or more virtual buttons.

Figure 5:
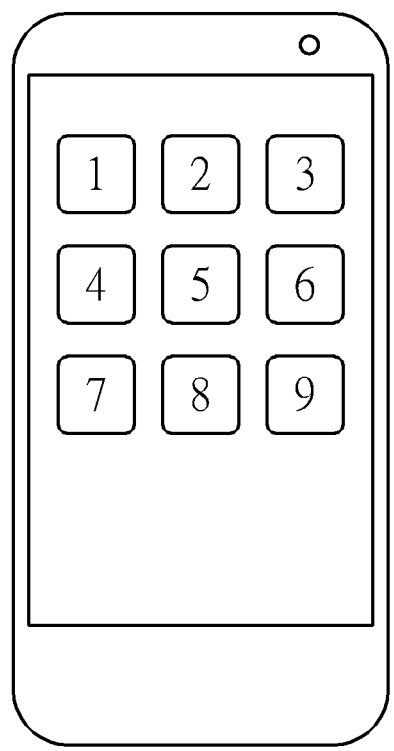
FIG. 5 illustrates a television (TV) control interface involved with the method shown in FIG. 3 according to an embodiment of the present invention.

FIG. 5 illustrates a TV control interface involved with the method 300 shown in FIG. 3 according to an embodiment of the present invention, where the TV control interface shown in FIG. 5 can be taken as an example of the TV control interface mentioned above. For example, the aforementioned virtual number pad may comprise a plurality of virtual buttons such as those representing the natural numbers 1 through to 9. This is for illustrative purposes only, and is not meant to be a limitation of the present invention. For example, in addition to the aforementioned virtual number pad, the TV control interface mentioned above may further comprise one or more virtual buttons.

Figure 6:
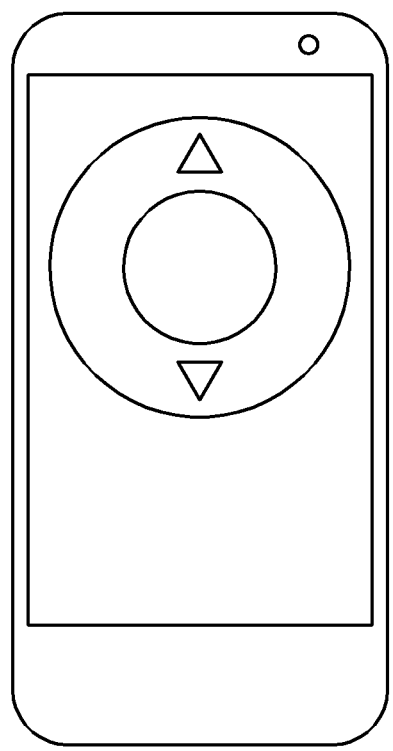
FIG. 6 illustrates a music control interface involved with the method shown in FIG. 3 according to an embodiment of the present invention.

FIG. 6 illustrates a music control interface involved with the method 300 shown in FIG. 3 according to an embodiment of the present invention, where the music control interface shown in FIG. 6 can be taken as an example of the music control interface mentioned above. For example, the aforementioned virtual circle bar may emulate a physical circle bar on a physical music player (e.g. MP3 player). This is for illustrative purposes only, and is not meant to be a limitation of the present invention. For example, in addition to the aforementioned virtual circle bar shown in FIG. 6, the music control interface mentioned above may further comprise one or more virtual buttons.

Figure 7:
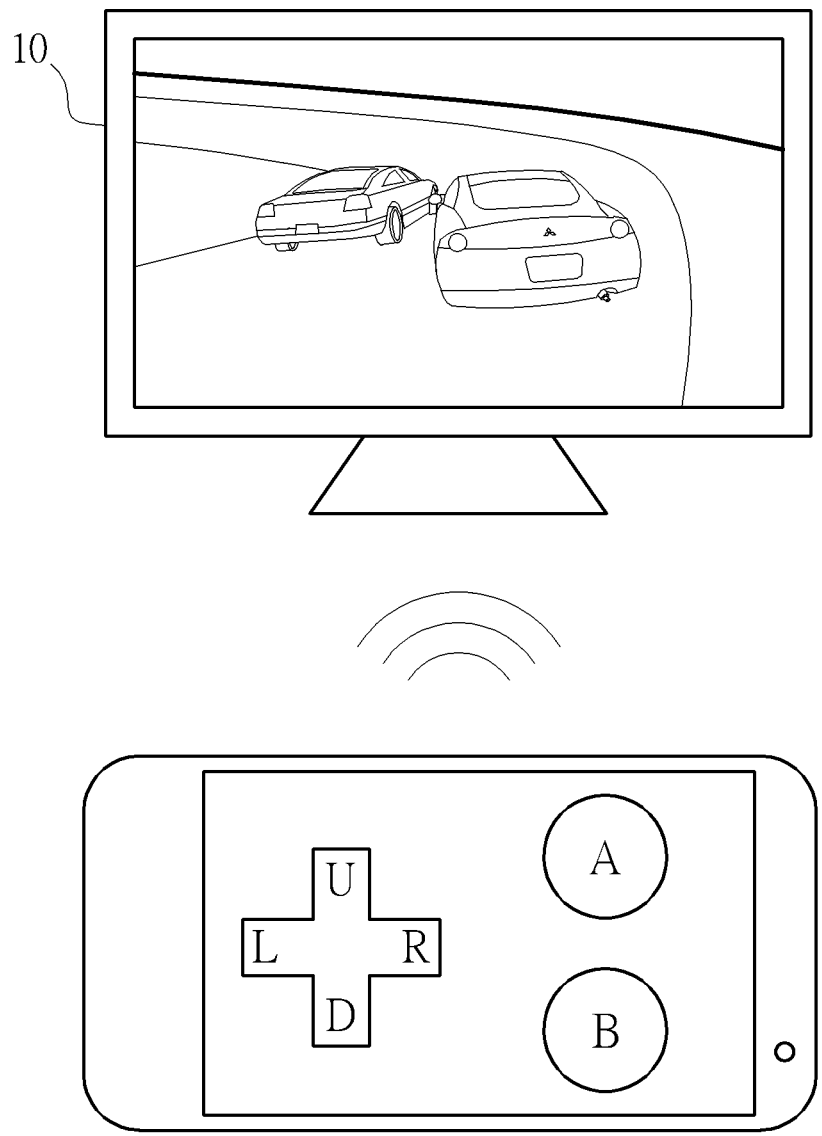
FIG. 7 illustrates a control scheme involved with the method shown in FIG. 3 according to an embodiment of the present invention.

FIG. 7 illustrates a control scheme involved with the method 300 shown in FIG. 3 according to an embodiment of the present invention. For example, when (or after) the electronic device is switched to the aforementioned extension mode, the processing circuit 110 may control the display module 210 to display the specific set of common UIs, such as the game control interface of the embodiment shown in FIG. 4, to allow the user to control the electronic device through the specific set of common UIs.

In the extension mode of this embodiment, the electronic device is arranged to output the display data to be displayed by the external display device 10 mentioned above (e.g. a digital TV or a monitor). As a result, the user may play many different games by utilizing the same game control interface, such as the game control interface of the embodiment shown in FIG. 4, where the user does not need to waste his/her time on learning (or getting familiar with) new game control interfaces of various kinds of games.

Figure 8:
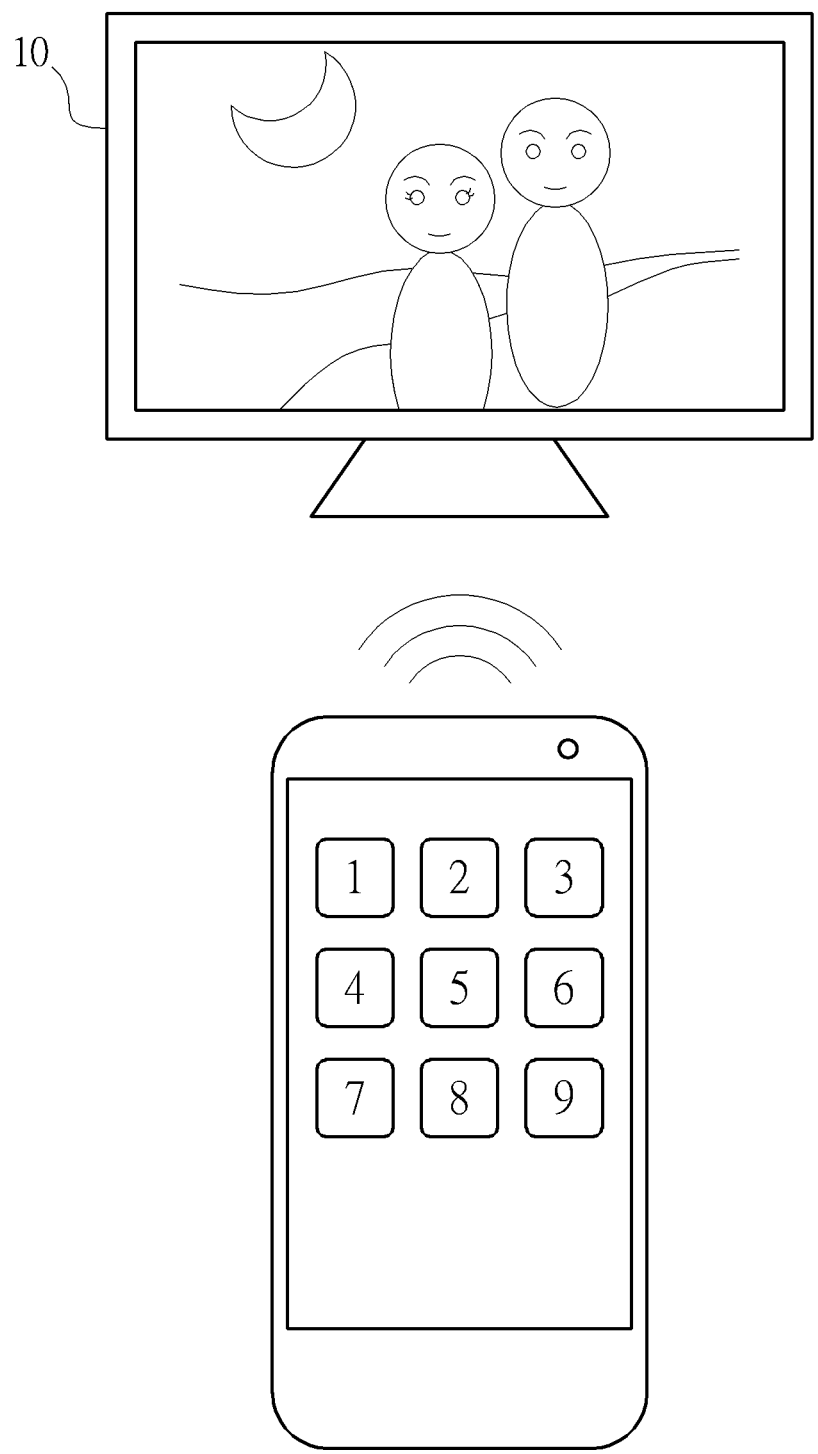
FIG. 8 illustrates a control scheme involved with the method shown in FIG. 3 according to another embodiment of the present invention.

FIG. 8 illustrates a control scheme involved with the method 300 shown in FIG. 3 according to another embodiment of the present invention. For example, when (or after) the electronic device is switched to the aforementioned extension mode, the processing circuit 110 may control the display module 210 to display the specific set of common UIs, such as the TV control interface of the embodiment shown in FIG. 5, to allow the user to control the electronic device through the specific set of common UIs.

In the extension mode of this embodiment, the electronic device is arranged to output the display data to be displayed by the external display device 10 mentioned above (e.g. a digital TV or a monitor). As a result, when the user wants to watch TV, the user may run different TV receiver applications by utilizing the same TV control interface, such as the TV control interface of the embodiment shown in FIG. 5, where the user does not need to waste his/her time on learning (or getting familiar with) new TV control interfaces of various kinds of TV receiver applications.

Figure 9:
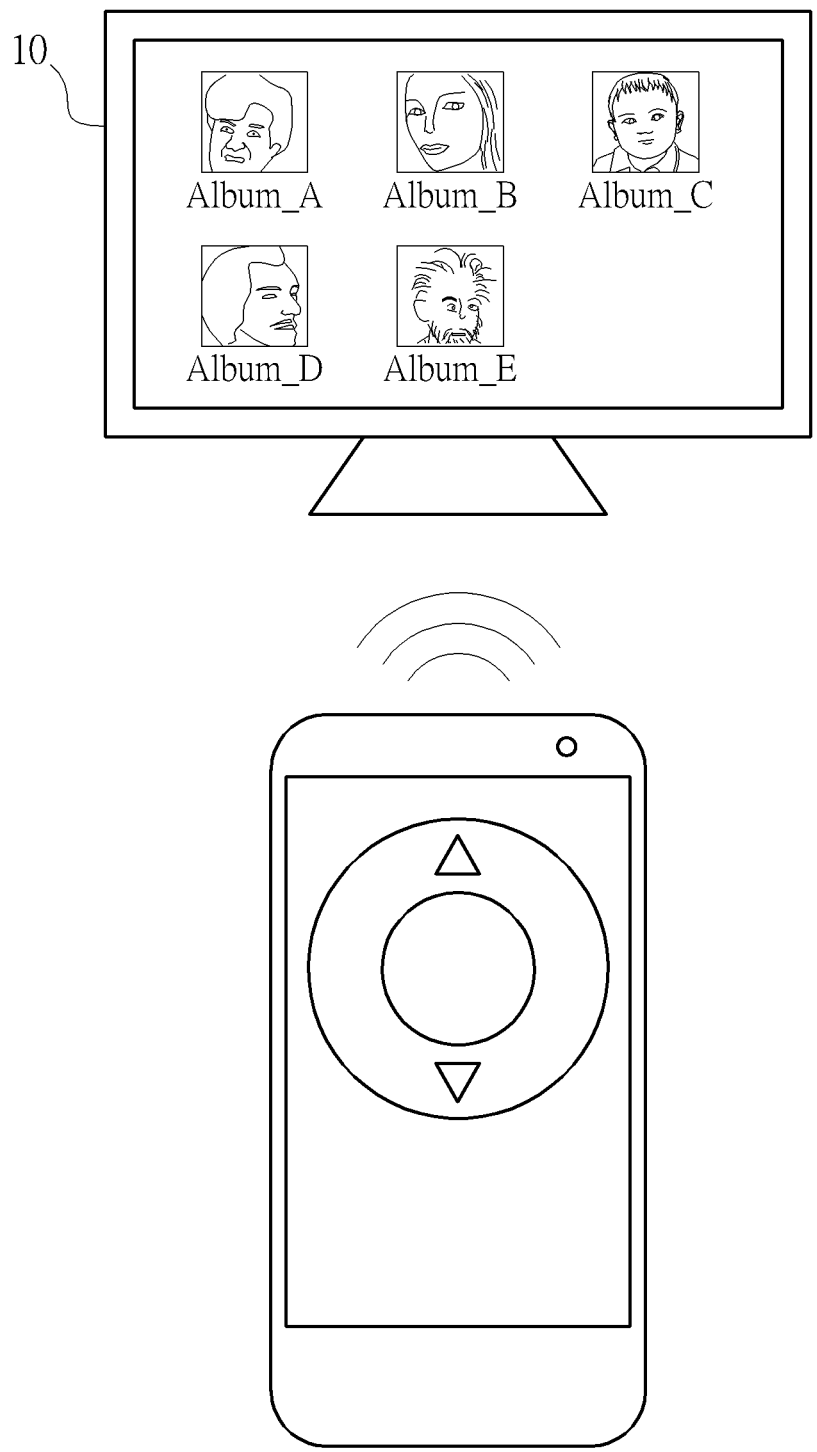
FIG. 9 illustrates a control scheme involved with the method shown in FIG. 3 according to another embodiment of the present invention.

FIG. 9 illustrates a control scheme involved with the method 300 shown in FIG. 3 according to another embodiment of the present invention. For example, when (or after) the electronic device is switched to the aforementioned extension mode, the processing circuit 110 may control the display module 210 to display the specific set of common UIs, such as the music control interface of the embodiment shown in FIG. 6, to allow the user to control the electronic device through the specific set of common UIs.

In the extension mode of this embodiment, the electronic device is arranged to output the display data to be displayed by the external display device 10 mentioned above (e.g. a digital TV or a monitor). As a result, when the user wants to listen to the music, the user may run different music player applications by utilizing the same music control interface, such as the music control interface of the embodiment shown in FIG. 6, where the user does not need to waste his/her time on learning (or getting familiar with) new music control interfaces of various kinds of music player applications.

Figure 10:
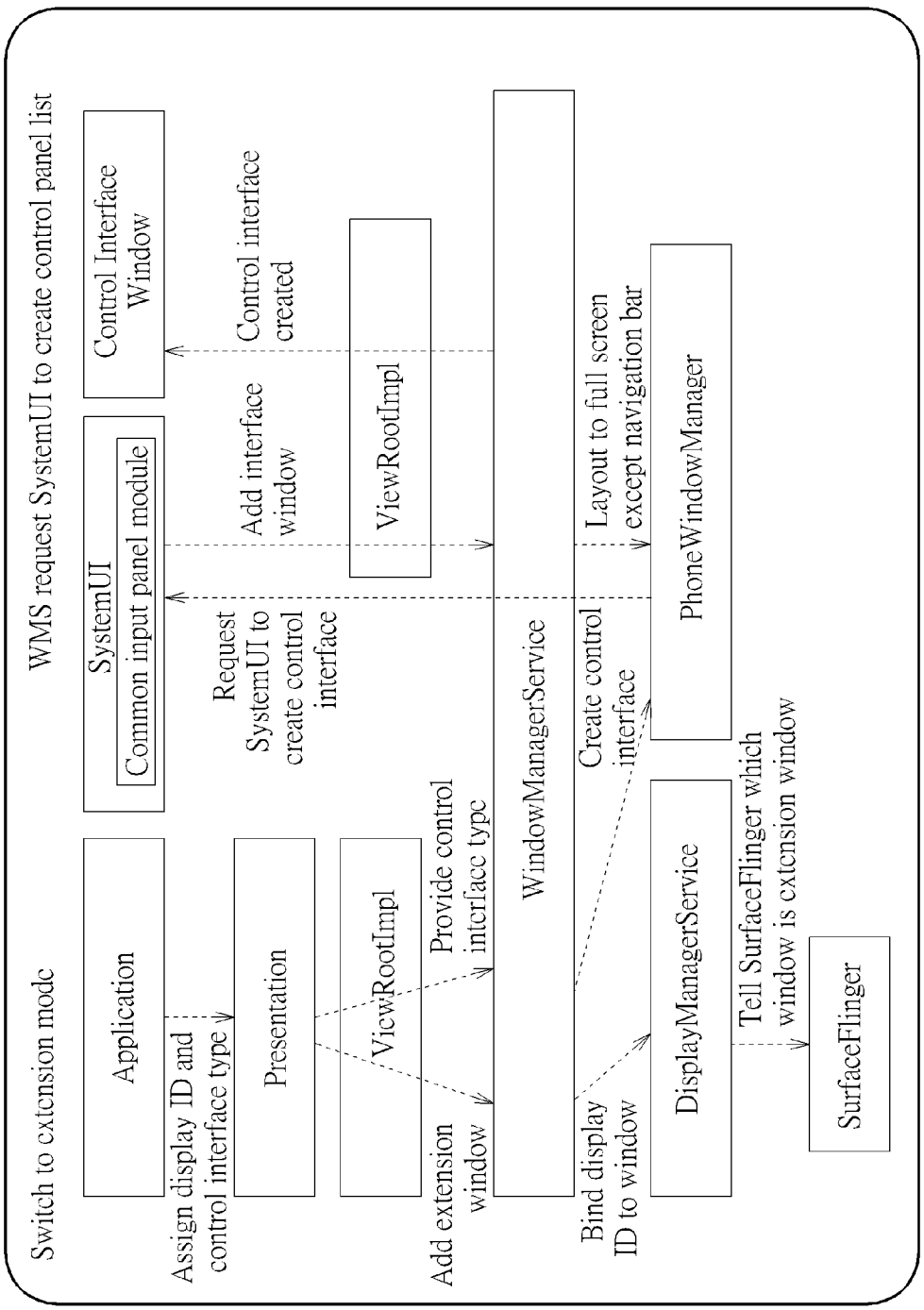
FIG. 10 illustrates a software architecture involved with the method shown in FIG. 3 according to an embodiment of the present invention.

FIG. 10 illustrates a software architecture involved with the method 300 shown in FIG. 3 according to an embodiment of the present invention. As mentioned above, the processing circuit 110 may allow multiple applications to use the same virtual control interface set, where this virtual control interface set may be provided by the aforementioned system framework running on the electronic device (e.g. the system framework of the OS mentioned above). For better comprehension, the specific set of common UIs can be taken as an example of this virtual control interface set.

According to this embodiment, the aforementioned system framework such as that of the software architecture shown in FIG. 10 may comprises a system UI software component (labeled "SystemUI" in FIG. 10, for brevity), where the system UI software component may comprise a common input panel module arranged to provide the electronic device with the specific set of common UIs, and more particularly, to provide the electronic device with any set of the plurality of sets of common UIs in response to a request. The system UI software component may be arranged to provide the electronic device with at least one of a virtual home key, a virtual key bar, and a status bar. For example, the request may carry the common UI selection parameter mentioned above. In this embodiment, a phone window manager software component (labeled "PhoneWindowManager" in FIG. 10, for brevity) running on the electronic device may be arranged to forward the request to the system UI software component (labeled "SystemUI" in FIG. 10), to cause the aforementioned common input panel module to provide the electronic device with the specific set of common UIs. More particularly, the phone window manager software component may receive the request indirectly from the specific application. This is for illustrative purposes only, and is not meant to be a limitation of the present invention. According to a variation of this embodiment, the phone window manager software component may receive the request directly from the specific application.

According to this embodiment, the software architecture shown in FIG. 10 can be applied to the electronic device in a situation where the electronic device is switched to the aforementioned extension mode. The application shown around the upper left corner of FIG. 10 can be taken as an example of the specific application mentioned above. In the extension mode of this embodiment, the specific application may transmit different display data, such as first display data (e.g. the display data of the specific set of common UIs) and second display data (e.g. the aforementioned display data to be displayed by the external display device 10 mentioned above), through a first information path shown around the leftmost of FIG. 10, where the first information path maybe arranged to pass through a presentation software component, a view root implementation software component, a window manager service software component, a display manager service software component, and a surface flinger software component (which are respectively labeled "Presentation", "ViewRootImpl", "WindowManagerService", "DisplayManagerService", and "SurfaceFlinger" in FIG. 10, for brevity), and may be arranged to be split into two information sub-paths at the physical layer next to the surface flinger software component (labeled "SurfaceFlinger" in FIG. 10). As a result, the first display data and the second display data may be sent toward the display module 210 and the external display device 10, respectively.

In practice, some software components shown in FIG. 10 may be implemented by establishing a new information path arranged to transmit the request mentioned above. For example, the new information path may be arranged to pass through the presentation software component, the view root implementation software component, the window manager service software component, and the phone window manager software component (which are respectively labeled "Presentation", "ViewRootImpl", "WindowManagerService", and "PhoneWindowManager" in FIG. 10, for brevity), and to reach the system UI software component (labeled "SystemUI" in FIG. 10), and more particularly, the common input panel module therein. This is for illustrative purposes only, and is not meant to be a limitation of the present invention.

Some implementation details regarding the operations performed by the software components shown in FIG. 10 are further described as follows. As shown in FIG. 10, the application (labeled "Application" in FIG. 10) may send at least one command toward the presentation software component (labeled "Presentation" in FIG. 10) to assign the display ID and the control interface type. In addition, the presentation software component may send at least one command through the aforementioned view root implementation software component (which is labeled "ViewRootImpl" in FIG. 10, and is illustrated at the left side of FIG. 10) toward the window manager service software component (labeled "WindowManagerService" in FIG. 10), to add at least one extension window (e.g. one or more extension window) and to provide the control interface type. This view root implementation software component (which is labeled "ViewRootImpl" in FIG. 10, and is illustrated at the left side of FIG. 10) may act as an intermediate software component between the presentation software component and the window manager service software component, along any of the first information path and the new information path.

More particularly, along the first information path, the window manager service software component (labeled "WindowManagerService" in FIG. 10) may send at least one command toward the display manager service software component (labeled "DisplayManagerService" in FIG. 10), to bind the display ID to the window (more particularly, the extension window mentioned above), and the display manager service software component may send at least one command toward the surface flinger software component (labeled "SurfaceFlinger" in FIG. 10), to notify (labeled "Tell" in FIG. 10) the surface flinger software component of which window is the extension window.

In addition, along the new information path, the window manager service software component (labeled "WindowManagerService" in FIG. 10) may send at least one command toward the phone window manager software component (labeled "PhoneWindowManager" in FIG. 10), to create the control interface, and the phone window manager software component may send at least one command through the window manager service software component toward the system UI software component (labeled "SystemUI" in FIG. 10), to request the system UI software component to create the control interface. As a result, the phone window manager software component forwards the aforementioned request to the system UI software component, to cause the aforementioned common input panel module to provide the electronic device with the specific set of common UIs.

Additionally, the system UI software component (labeled "SystemUI" in FIG. 10) may send at least one command through another view root implementation software component (which is also labeled "ViewRootImpl" in FIG. 10, and is illustrated at the right side of FIG. 10) toward the window manager service software component (labeled "WindowManagerService" in FIG. 10), to add the interface window in response to the aforementioned request, where this view root implementation software component may act as an intermediate software component between the system UI software component and the window manager service software component. This is for illustrative purposes only, and is not meant to be a limitation of the present invention. As a result, the window manager service software component (labeled "WindowManagerService" in FIG. 10) may send at least one command toward the phone window manager software component (labeled "PhoneWindowManager" in FIG. 10), to layout to full screen except the navigation bar, and the control interface is created. As shown around the upper right corner of FIG. 10, the control interface window software component (labeled "Control Interface Window" in FIG. 10) can be taken as an example of the created control interface.

As mentioned above, the software architecture shown in FIG. 10 can be applied to the electronic device in a situation where the electronic device is switched to the aforementioned extension mode. This is for illustrative purposes only, and is not meant to be a limitation of the present invention. According to some variations of this embodiment, in a situation where the electronic device is not switched to the aforementioned extension mode, the software architecture shown in FIG. 10 can still be applied to the electronic device, except that the operations regarding outputting the second display data can be removed since it is unnecessary to output the second display data to the external display device 10 mentioned above (e.g. a digital TV or a monitor). According to some variations of this embodiment, in a situation where the extension mode does not exist, the software architecture shown in FIG. 10 can still be applied to the electronic device, except that the operations regarding outputting the second display data can be removed since it is unnecessary to output the second display data to the external display device 10 mentioned above.

Figure 11:
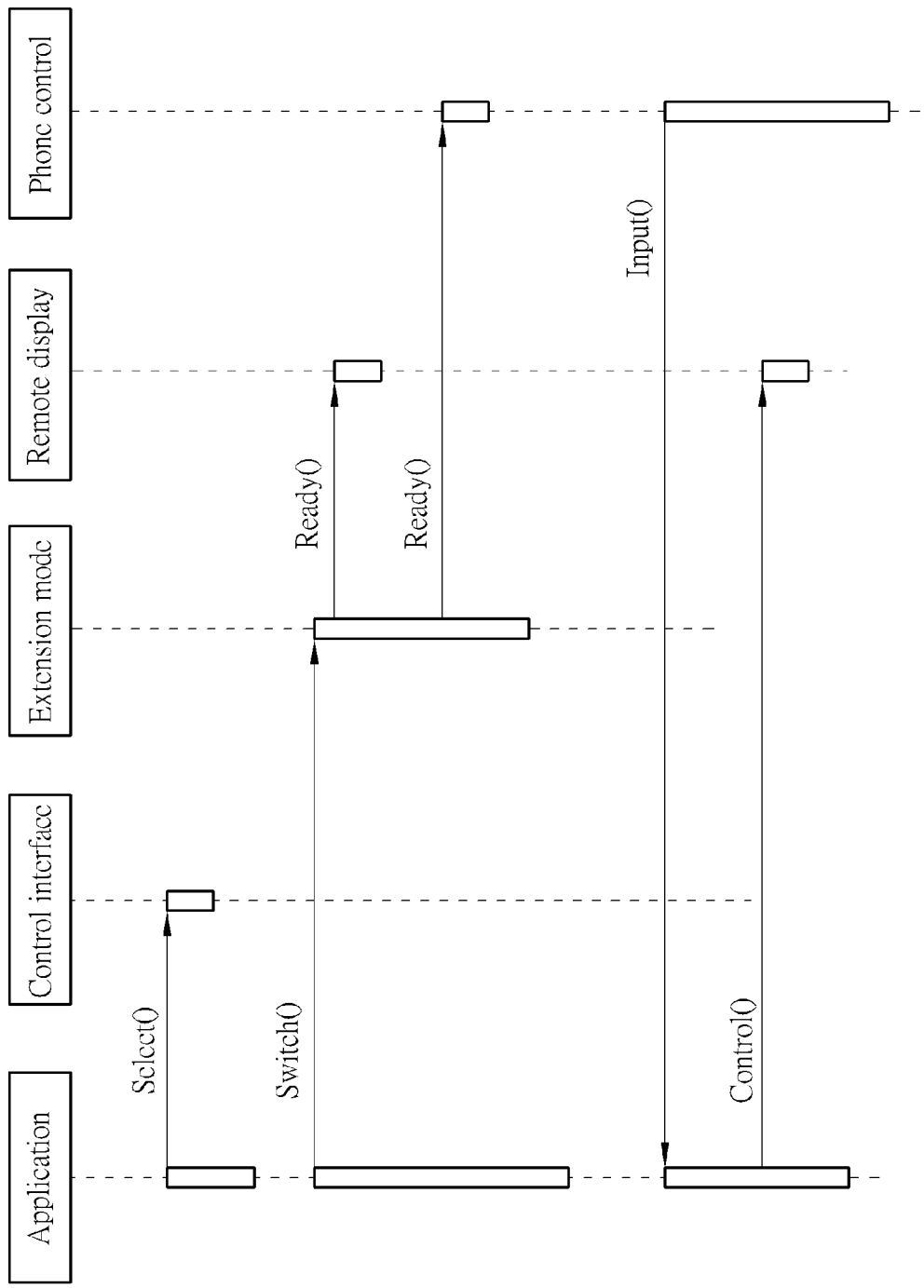
FIG. 11 illustrates a timing chart involved with the method shown in FIG. 3 according to an embodiment of the present invention.

FIG. 11 illustrates a timing chart involved with the method 300 shown in FIG. 3 according to an embodiment of the present invention. As mentioned above, the processing circuit 110 may allow multiple applications to use the same virtual control interface set, where this virtual control interface set may be provided by the aforementioned system framework running on the electronic device (e.g. the system framework of the OS mentioned above). For better comprehension, the specific set of common UIs can be taken as an example of this virtual control interface set. In practice, the processing circuit 110 may obtain a common UI selection parameter such as that mentioned above from the aforementioned specific application, where the common UI selection parameter is utilized for indicating one set of common UIs within the plurality of sets of common UIs mentioned above. In some embodiments, the processing circuit 110 may obtain the common UI selection parameter before, when or after the specific application starts running on the electronic device. This is for illustrative purposes only, and is not meant to be a limitation of the present invention.

As shown in FIG. 11, the application (e.g. the specific application) may send at least one command (labeled "Select 0 " in FIG. 11, for example) carrying the aforementioned common UI selection parameter to ask for selecting the specific set of common UIs, which can be the control interface corresponding to the control interface type mentioned above. Then, the application may send at least one command (labeled "Switch( )" in FIG. 11, for example) to ask for switching to the extension mode, based on the user instruction indicated by the aforementioned certain user action, for example. Afterward, the corresponding ready notification (labeled "ready( )" in FIG. 11, for example) may be sent to the remote display (e.g. the external display device 10 mentioned above) and the phone control (e.g. the system UI software component mentioned in the embodiment shown in FIG. 10, and more particularly, the common input panel module therein), respectively. Under control of the phone control mechanism (labeled "Phone control" in FIG. 11, for brevity), the electronic device may send the user input (labeled "input( )" in FIG. 11, for example) to the application, and therefore, the application send the associated control (labeled "control( )" in FIG. 11, for example) to the remote display in response to the user input. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing virtual control interface of an electronic device, the method comprising the steps of:
   utilizing a specific set of common user interfaces (UIs) as a common service for a plurality of applications, wherein the specific set of common UIs is a set of virtual control interfaces to be displayed on a screen, and the specific set of common UIs is provided by a system framework running on the electronic device, rather than being provided by any of the plurality of applications; and
   displaying the specific set of common UIs to allow a user to control the electronic device through the specific set of common UIs.

2. The method of claim 1, further comprising:
   selecting the specific set of common UIs from a plurality of sets of common UIs, wherein each set of common UIs within the plurality of sets of common UIs is a set of virtual control interfaces to be displayed on the screen, and the plurality of sets of common UIs is provided by the system framework running on the electronic device, rather than being provided by any of the plurality of applications.

3. The method of claim 2, wherein each set of common UIs within the plurality of sets of common UIs is provided by the system framework running on the electronic device, rather than being provided by any application installed in the electronic device.

4. The method of claim 2, further comprising:
   obtaining a common UI selection parameter from a specific application of the plurality of applications, wherein the common UI selection parameter is utilized for indicating one set of common UIs within the plurality of sets of common UIs;
   wherein the step of selecting the specific set of common UIs from the plurality of sets of common UIs further comprises:
   selecting the specific set of common UIs from the plurality of sets of common UIs according to the common UI selection parameter.

5. The method of claim 2, wherein the step of selecting the specific set of common UIs from the plurality of sets of common UIs further comprises:

based on user setting(s) or default setting(s), selecting the specific set of common UIs from the plurality of sets of common UIs.

6. The method of claim 2, wherein the plurality of sets of common UIs comprises a game control interface, a television (TV) control interface, a music control interface or a combination thereof, wherein
the game control interface is used for game control and comprises a virtual direction pad and one or more virtual buttons,
the TV control interface is used for TV control and comprises a virtual number pad, and
the music control interface is used for music control and comprises a virtual circle bar.

7. The method of claim 1, wherein the step of displaying the specific set of common UIs to allow the user to control the electronic device through the specific set of common UIs further comprises:
when the electronic device is switched to an extension mode, displaying the specific set of common UIs to allow the user to control the electronic device through the specific set of common UIs, wherein in the extension mode, the electronic device is arranged to output display data to be displayed by another electronic device.

8. The method of claim 1, wherein the system framework comprises a system UI software component, and the system UI software component comprises:
a common input panel module arranged to provide the electronic device with the specific set of common UIs.

9. The method of claim 8, wherein a phone window manager software component running on the electronic device is arranged to forward a request to the system UI software component, to cause the common input panel module to provide the electronic device with the specific set of common UIs.

10. The method of claim 9, wherein the phone window manager software component receives the request directly or indirectly from a specific application of the plurality of applications.

11. An apparatus for managing virtual control interface of an electronic device, the apparatus comprising at least one portion of the electronic device, the apparatus comprising:
a processing circuit, arranged to control operations of the electronic device according to program instructions, wherein the processing circuit utilizes a specific set of common user interfaces (UIs) as a common service for a plurality of applications, wherein the specific set of common UIs is a set of virtual control interfaces to be displayed on a screen, and the specific set of common UIs is provided by a system framework running on the electronic device, rather than being provided by any of the plurality of applications;
wherein the processing circuit controls a display module of the electronic device to display the specific set of common UIs to allow a user to control the electronic device through the specific set of common UIs.

12. The apparatus of claim 11, wherein the processing circuit selects the specific set of common UIs from a plurality of sets of common UIs, wherein each set of common UIs within the plurality of sets of common UIs is a set of virtual control interfaces to be displayed on the screen, and the plurality of sets of common UIs is provided by the system framework running on the electronic device, rather than being provided by any of the plurality of applications.

13. The apparatus of claim 12, wherein each set of common UIs within the plurality of sets of common UIs is provided by the system framework running on the electronic device, rather than being provided by any application installed in the electronic device.

14. The apparatus of claim 12, wherein the processing circuit obtains a common UI selection parameter from a specific application of the plurality of applications, wherein the common UI selection parameter is utilized for indicating one set of common UIs within the plurality of sets of common UIs; and the processing circuit selects the specific set of common UIs from the plurality of sets of common UIs according to the common UI selection parameter.

15. The apparatus of claim 12, wherein based on user setting(s) or default setting(s), the processing circuit selects the specific set of common UIs from the plurality of sets of common UIs.

16. The apparatus of claim 12, wherein the plurality of sets of common UIs comprises a game control interface, a television (TV) control interface, a music control interface or a combination thereof, wherein
the game control interface is used for game control and comprises a virtual direction pad and one or more virtual buttons,
the TV control interface is used for TV control and comprises a virtual number pad, and
the music control interface is used for music control and comprises a virtual circle bar.

17. The apparatus of claim 11, wherein when the electronic device is switched to an extension mode, the processing circuit controls the display module to display the specific set of common UIs to allow the user to control the electronic device through the specific set of common UIs, wherein in the extension mode, the electronic device is arranged to output display data to be displayed by another electronic device.

18. The apparatus of claim 11, wherein the system framework comprises a system UI software component, and the system UI software component comprises:
a common input panel module arranged to provide the electronic device with the specific set of common UIs.

19. The apparatus of claim 18, wherein a phone window manager software component running on the electronic device is arranged to forward a request to the system UI software component, to cause the common input panel module to provide the electronic device with the specific set of common UIs.

20. A computer program product, having program instructions for instructing a processor of an electronic device to perform a method comprising the steps of:
utilizing a specific set of common user interfaces (UIs) as a common service for a plurality of applications, wherein the specific set of common UIs is a set of virtual control interfaces to be displayed on a screen, and the specific set of common UIs is provided by a system framework running on the electronic device, rather than being provided by any of the plurality of applications; and
displaying the specific set of common UIs to allow a user to control the electronic device through the specific set of common UIs.

* * * * *